United States Patent
Ji et al.

(10) Patent No.: US 11,711,038 B2
(45) Date of Patent: Jul. 25, 2023

(54) VECTOR CONTROL METHOD FOR VEHICLE PERMANENT MAGNET SYNCHRONOUS MOTOR BASED ON DC POWER

(71) Applicant: Zhejiang University City College, Zhejiang (CN)

(72) Inventors: Feifan Ji, Hangzhou (CN); Jing Li, Hangzhou (CN); Yuwei Chen, Hangzhou (CN)

(73) Assignee: Zhejiang University City College, Hangzhou (CN)

( * ) Notice: Subject to any disclaimer, the term of this patent is extended or adjusted under 35 U.S.C. 154(b) by 0 days.

(21) Appl. No.: 17/740,285

(22) Filed: May 9, 2022

(65) Prior Publication Data
US 2022/0302862 A1 Sep. 22, 2022

Related U.S. Application Data

(63) Continuation of application No. PCT/CN2022/070799, filed on Jan. 7, 2022.

(30) Foreign Application Priority Data

Mar. 22, 2021 (CN) .......................... 202110302182.8

(51) Int. Cl.
*H02P 9/00* (2006.01)
*H02P 21/00* (2016.01)
*H02P 21/22* (2016.01)

(52) U.S. Cl.
CPC .......... *H02P 21/0089* (2013.01); *H02P 21/22* (2016.02); *H02P 2207/05* (2013.01)

(58) Field of Classification Search
CPC ...... H02P 9/007; H02P 21/0089; H02P 21/22; H02P 2207/05; H02M 7/217
See application file for complete search history.

(56) References Cited

U.S. PATENT DOCUMENTS 10,523,128 B1 * 12/2019 Mohamed Sayed Ahmed ............ H02M 7/217
2018/0171976 A1 * 6/2018 Tan ........................ H02P 9/007

FOREIGN PATENT DOCUMENTS

CN 103988419 A 8/2014
CN 106357182 A 1/2017
(Continued)

OTHER PUBLICATIONS

International Search Report (PCT/CN2022/070799); dated Mar. 16, 2022.
(Continued)

*Primary Examiner* — Cortez M Cook
(74) *Attorney, Agent, or Firm* — . W&G Law Group

(57) ABSTRACT

Discloses a vector control method for a vehicle permanent magnet synchronous motor based on a DC power, which comprises a current closed-loop adjuster, a modulation index deviation calculator, a current command angle compensator, a current angle preset, a current command angle limit comparator, a current given amplitude compensator and a current given vector corrector. According to the present disclosure, the adjusting direction is always a flux-weakening direction, and instability caused by repeated adjustment will not occur; according to the present disclosure, by introducing the current for simultaneous correction, the voltage saturation-resistant pressure can be shared to the dq current, so that excessive output torque deviation caused by excessive adjustment of a single-axis current can be avoided; the traditional flux weakening target that the system is controlled without losing stability is ensured, and the accuracy of the torque is ensured.

6 Claims, 9 Drawing Sheets

(56) References Cited

FOREIGN PATENT DOCUMENTS

| CN | 111149287 A | 5/2020 |
|----|-------------|--------|
| CN | 111262492 A | 6/2020 |
| CN | 111277182 A | 6/2020 |
| CN | 111711394 A | 9/2020 |
| CN | 112671300 A | 4/2021 |
| CN | 113328666 A | 8/2021 |
| EP | 3168979 A1  | 5/2017 |
| JP | 2010172060 A | 8/2010 |

OTHER PUBLICATIONS

CN First Office Action(202110302182.8); dated Apr. 22, 2021.
Analytical Design and Auto-Tuning of Adaptive Flux-Weakening Voltage Regulation Loop in IPMSM Drives with Accurate Torque Regulation; Date of Mailing: Feb. 29, 2020.

* cited by examiner

VECTOR CONTROL METHOD FOR VEHICLE PERMANENT MAGNET SYNCHRONOUS MOTOR BASED ON DC POWER

CROSS-REFERENCE TO RELATED APPLICATIONS

The present application is a continuation of International Application No. PCT/CN2022/070799, filed on Jan. 7, 2022, which claims priority to Chinese Application No. 202110302182.8, filed on Mar. 22, 2021, the contents of both of which are incorporated herein by reference in their entireties.

TECHNICAL FIELD

The present disclosure belongs to the field of permanent magnet synchronous motor control, and in particular relates to a vector control method for a vehicle permanent magnet synchronous motor based on a DC power.

BACKGROUND

In a vehicle interior permanent magnet synchronous motor (IPMSM) control system, due to the inevitable change of the controlled object-IPMSM in the actual application scene, the pre-solidified control parameters in the control program become invalid, which leads to the voltage saturation caused by insufficient flux weakening during the high-speed operation of the motor and endangers the stability of the motor drive system.

An interior permanent magnet synchronous motor (PMSM) has the characteristics of a high power density, a wide operating range and a high efficiency, so it is widely used as the driving motor of electric vehicles; the torque equation thereof is:

$$T_e = 1.5 P_n (\varphi_f i_q + (L_d - L_q) i_d i_q) \qquad (1)$$

where $T_e$ is the electromagnetic torque of the motor; $P_n$ is the number of motor pole pairs; $\varphi_f$ is the magnetic flux of a rotor permanent magnet; $i_q$ is a q-axis current and $i_d$ is a d-axis current; $L_d$ is a d-axis inductance; $L_q$ is a q-axis inductance; in the normal driving process of an IPMSM, $T_e > 0, i_q > 0, i_d < 0, L_d < L_q$.

It can be seen from the above formula that the torque is positively correlated with the current, but different dq axis current combinations will correspond to different torques, and each fixed current amplitude will have a set of specific dq current combinations to enable the motor to output the maximum torque at this current. Due to the saturation of a magnetic field, the dq-axis inductances $L_d$ and $L_q$ will change with the change of the current when the current is larger than a certain range, and the change range can be as much as 200%. The changes of these parameters make it very difficult or even infeasible to solve the optimal dq current combination at each current online. Therefore, in vehicle motor control, the optimal current combination corresponding to each torque is generally obtained through experimental test and calibration. The line connected by all such current combinations in the whole torque range is called the maximum toque per ampere (MTPA) curve of the IPMSM.

In addition, the operation of the IPMSM for vehicles depends on the inverter converting the bus of a power battery into a three-phase AC, which means that the terminal voltage of the motor is constrained by a DC bus; the voltage equation of the IPMSM is:

$$V_d = i_d R_s + L_d \frac{di_d}{dt} - \omega L_q i_q \qquad (2)$$

$$V_q = i_q R_s + L_q \frac{di_q}{dt} + \omega(\varphi_f + L_d i_d)$$

where $V_d$ is a d-axis voltage of the motor and $V_q$ is a q-axis voltage of the motor; $R_s$ is a stator resistance and $\omega$ is the electrical angular velocity of the motor.

At a high speed and a steady state, the amplitude of the terminal voltage of the motor is approximately as follows: $V_s$ $$|V_s| = \omega \sqrt{(L_q i_q)^2 + (\varphi_f + L_d i_d)^2} \qquad (3).$$

When the motor speed increases, the terminal voltage of the motor increases. When it exceeds the amplitude of an AC voltage provided by the bus voltage, it is necessary to carry out flux weakening control. However, the maximum AC voltage provided by the current bus is the voltage limit $V_{s\_lmt}$, and the expression is generally as follows:

$$V_{s\_lmt} = V_{dc} \cdot MI_{max} / \sqrt{3}$$

where $V_{dc}$ is a bus voltage, $MI_{max}$ is the maximum modulation index of the motor control system, and its value is generally around 1, with a maximum of 1.1027.

In order to obtain the current combination which can satisfy the torque equation and the voltage limit, the dq current combination corresponding to each torque at different buses and rotating speeds is still calibrated by experimental means; then these data are tabulated and stored in a digital control chip, and when the motor is running in real time, the torque commands at different speeds and bus voltages are converted into corresponding dq current commands by looking up the table.

The premise that the above process can work normally is that the current combination obtained through the experimental calibration of the prototype can be applied to each motor of the same model; however, in practical application, there are the following aspects that will make this assumption no longer valid:

1. when the motor is produced in batches, the process and materials will inevitably lead to the inconsistency of the motor;

2. when the rotation offset of the motor is deviated, even when the current regulator works normally, it will lead to the deviation of the magnetic field orientation on the control, and then the actual dq current in the motor is inconsistent with the expected current command;

3. the change of the ambient temperature will affect the flux linkage of a permanent magnet, and when the temperature decreases, $\varphi_f$ will increase, resulting in that the calibrated dq current command no longer meets the voltage limit.

Therefore, in order to enhance the robustness of the electric drive control system in the high-speed operation area, a flux weakening control link is generally added.

A patent document CN101855825B puts forward a representative solution to the problem of motor control flux weakening. As shown in FIG. 1, a voltage deviation is obtained according to the difference between the output voltage of the current regulator and the voltage limit, and the current correction $\Delta I_d$ obtained from this deviation through a proportional integration link is superimposed on the D-axis current, and the upper limit of this correction is limited to 0, so as to deepen the flux weakening and achieve the purpose of flux weakening control. According to formula (3), when $(\varphi_f+L_d i_d)>0$, increasing the negative $i_d$ can reduce the output voltage, that is, this solution is effective; however, when $(\varphi_f+L_d i_d)<0$, if the negative $i_d$ continues to increase, the $V_q$ will reversely increases, which leads to further increase of the output voltage, which will lead to more serious voltage saturation. Therefore, when using this method, $(\varphi_f+L_d i_d)>0$ has to be ensured. However, in vehicle motor control, if this restriction is added, the reluctance torque of the motor in the high-speed area will not be fully utilized, and the performance of the motor will be sacrificed. Using the method of reducing $i_d$ in the above solution when the voltage is saturated can deepen the low-intensity magnetic field and make the motor exit the voltage saturation state. However, this method has a great influence on the output torque, because only by correcting $i_d$, a large amount of $i_d$ correction is needed, and the dq current combination changes greatly, which even has a great influence on the output torque. Non-patent literature (T. M. Jahns, "Flux Weakening Regime Operation of an Interior Permanent-Magnet Synchronous Motor Drive", IEEE Trans. on Ind. Appl., vol. IA-23, no. 4, pp. 55-63, 1987) proposed a method to reduce $i_q$ in a low-intensity magnetic field, but only adjusting a single current also faced the problem of great influence on output torque. At present, any better existing technology that can effectively deal with the voltage saturation problem and has as little impact on the output torque as possible has not been found yet.

SUMMARY

In view of the shortcomings of the prior art, the purpose of the present disclosure is to provide a vector control method for a vehicle permanent magnet synchronous motor based on a DC power.

The purpose of the present disclosure is realized through the following technical solution: a vector control method for a vehicle permanent magnet synchronous motor based on a DC power including a current closed-loop adjuster, a modulation index deviation calculator, a current command angle compensator, a current angle preset, a current command angle limit comparator, a current given amplitude compensator and a current given vector corrector;

an input of the current closed-loop adjuster is a dq current command output by the current given vector corrector, and after passing through a proportional-integral controller, a dq voltage command is output;

an input of the modulation index deviation calculator is the dq voltage command output by the current closed-loop adjuster; after extraction of a sum of squares, an expected modulation index $MI_{ref}$ is obtained, and then a difference between the expected modulation index and an expected maximum modulation index $MI_{max}$ a of the control system is obtained; after passing through a low-pass filter, a modulation index deviation $\Delta MI$ is output;

an input of the current angle compensator is the modulation index deviation output by the modulation index deviation calculator, and after passing through a proportional-integral compensator, a correction angle is output;

the current angle preset is used for presetting a current angle;

the current command angle limit comparator is used for limiting a current angle compensated by the correction angle output by the current command angle compensator to be above the current angle preset by the current angle preset;

an input of the current given amplitude compensator is a difference $\Delta P$ between an active power and a real-time power, and a current given amplitude adjustment is output after proportional-integral adjustment;

an input of the current given vector corrector is a current |i| compensated by the current given amplitude adjustment output by the current given amplitude compensator, and based on the current angle preset by the current angle preset, the dq current commands after flux weakening control are calculated.

Furthermore, in the current closed-loop adjuster, the dq voltage command is obtained from the dq current commands $i_{dref}$ and $i_{qref}$ and the deviation fed back by the dq current respectively through the proportional-integral controller.

Furthermore, in the modulation index deviation calculator, a difference $\Delta MI_0$ between $MI_{max}$ and $MI_{ref}$ is:

$$\Delta MI_0 = MI_{ref} - MI_{max}$$

$$MI_{ref} = \frac{\sqrt{3(v_{d\_ref}^2 + v_{q\_ref}^2)}}{V_{dc}}$$

where $v_{d\_ref}$ and $v_{q\_ref}$ are dq voltage commands, and $V_{dc}$ is the bus voltage.

Furthermore, in the current command angle compensator, the correction angle $\Delta \theta$ is:

$$\Delta \theta = \frac{k_p s + k_i}{s} \Delta MI$$

where $k_p$ is a proportional coefficient of the proportional-integral compensator and $k_i$ is an integral coefficient of the proportional-integral compensator; $\Delta MI$ is a modulation index deviation.

Furthermore, the current angle preset limits an orientation of the motor by depicting a current angle curve of a maximum toque per ampere MTPA, and presets the current angle as $\theta_{pre}$.

Furthermore, the current command angle limit comparator is used to limit the current angle as:

$$\theta + \Delta \theta \geqslant \theta_{pre}$$

where $\theta$ is the current angle before flux weakening control.

Furthermore, in the current given amplitude compensator, the current given amplitude adjustment $\Delta I$ is:

$$\Delta i = \frac{k_{pP} s + k_{iP}}{s} \Delta P$$

$$\Delta P = P_{tab} - P_{calcu}$$

$$P_{calcu} = U_{bus} \times I_{bus}$$

where $P_{tab}$ is an active power; $U_{bus}$ is a sampled value of a bus voltage and $I_{bus}$ is a sampled value of a bus current; $k_{pP}$ and $k_{iP}$ are proportional coefficient and integral coefficient of proportional integration in the current given amplitude compensator.

Furthermore, in the current given vector corrector, the dq current commands $i_{dref}$ and $i_{qref}$ are calculated:

$$\begin{cases} i_{qref} = |i| \cos(\theta + \Delta\theta) \\ i_{dref} = -|i|\sin(\theta + \Delta\theta) \end{cases} \theta + \Delta\theta > \theta_{pre}$$

$$\begin{cases} i_{qref} = |i| \cos(\theta_{pre}) \\ i_{dref} = -|i|\sin(\theta_{pre}) \end{cases} \text{else}$$

$$|i| = |i|_{origin} + \Delta i$$

where $|i|_{origin}$ is a current before flux weakening control.

The present disclosure has the following beneficial effects:

(1) according to the present disclosure, the adjusting direction is always a flux-weakening direction, and instability caused by repeated adjustment will not occur;

(2) according to the present disclosure, by introducing the dq current for simultaneous correction, the voltage saturation-resistant pressure can be shared to the dq current, so that excessive output torque deviation caused by excessive adjustment of a single-axis current can be avoided;

(3) according to the present disclosure, the traditional flux weakening target that the system is controlled without losing stability is ensured, and at the same time, the accuracy of the torque is ensured.

DESCRIPTION OF EMBODIMENTS

Figure 1:
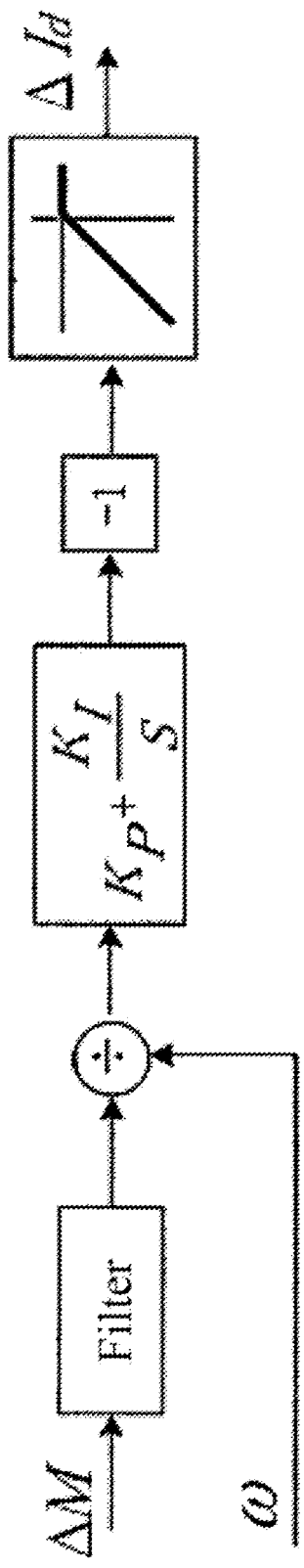
FIG. 1 is a topology block diagram of a prior art of flux weakening control.
Figure 2:
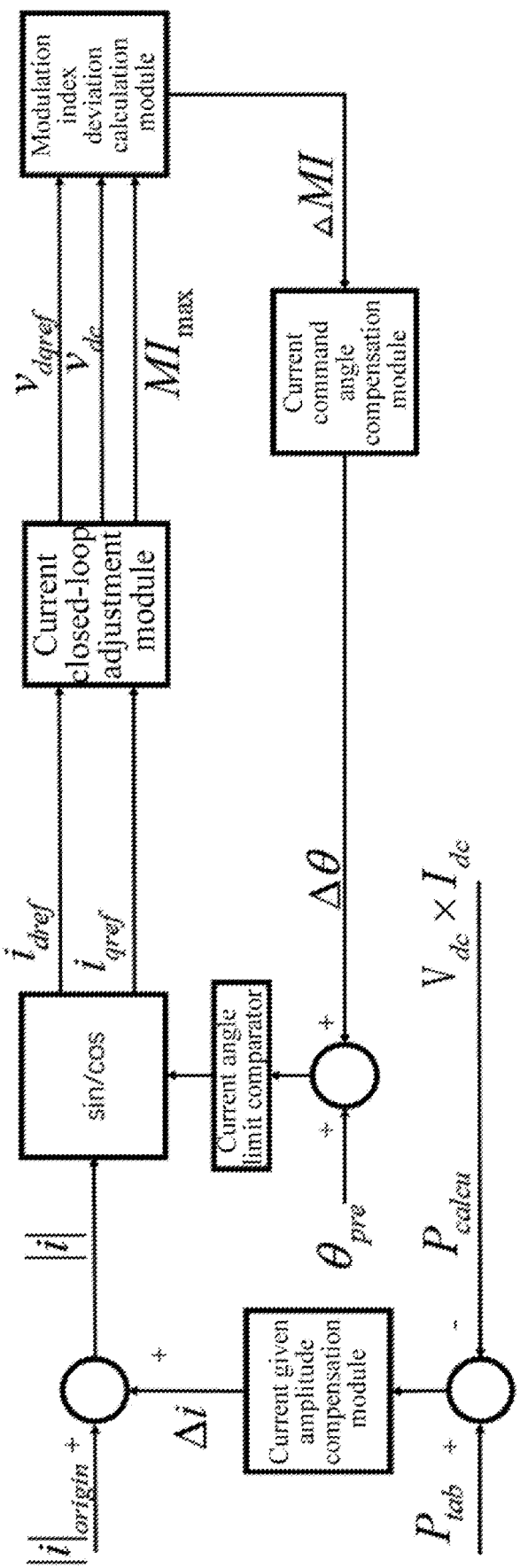
FIG. 2 is a block diagram of the overall topology of the present disclosure.

The present disclosure ensures the safety of the drive system, and at the same time, reduces the influence of the flux weakening control link on the output torque of the drive system as much as possible. To achieve the above purpose, as shown in FIG. 2, the vector control method for a vehicle permanent magnet synchronous motor based on a DC power of the present disclosure includes:

1. Current closed-loop adjuster: this part is a dependent module of the present disclosure, and its function is to obtain a dq voltage command $v_{dqref}$ from the dq current commands $i_{dref}$ and $i_{qref}$ and the deviation fed back by the dq current respectively through the proportional-integral PI controller.

Figure 3:
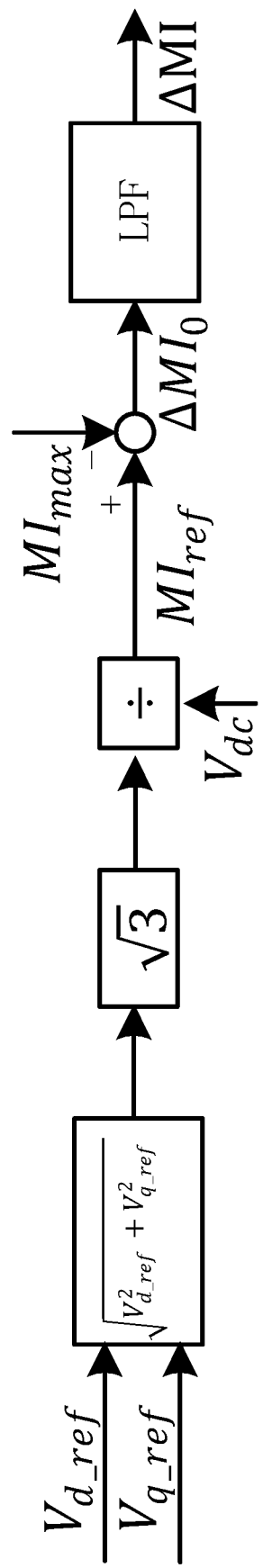
FIG. 3 is a schematic diagram of modulation index deviation calculation.

2. Modulation index deviation calculator: As shown in FIG. 3, $MI_{ref}$ is obtained from the extraction of the sum of squares of the dq voltage command output by the current closed loop adjuster:

$$MI_{ref} = \frac{\sqrt{3(v_{d\_ref}^2 + v_{q\_ref}^2)}}{V_{dc}}$$

where $v_{d\_ref}$ and $v_{q\_ref}$ are dq components of $v_{dqref}$, and $V_{dc}$ is a bus voltage; then $\Delta MI_0$ is obtained by the difference between the expected maximum modulation index $MI_{max}$ of the control system and the expected modulation index $MI_{ref}$:

$$\Delta MI_0 = MI_{ref} - MI_{max}$$

a modulation index deviation $\Delta MI$ is obtained by a low-pass filter (LPF); the function of the low-pass filter is to remove the high-frequency noise in the dq current closed-loop adjuster, so that the output flux weakening control device can smooth the output current correction and prevent the motor torque from fluctuating greatly.

Figure 4:
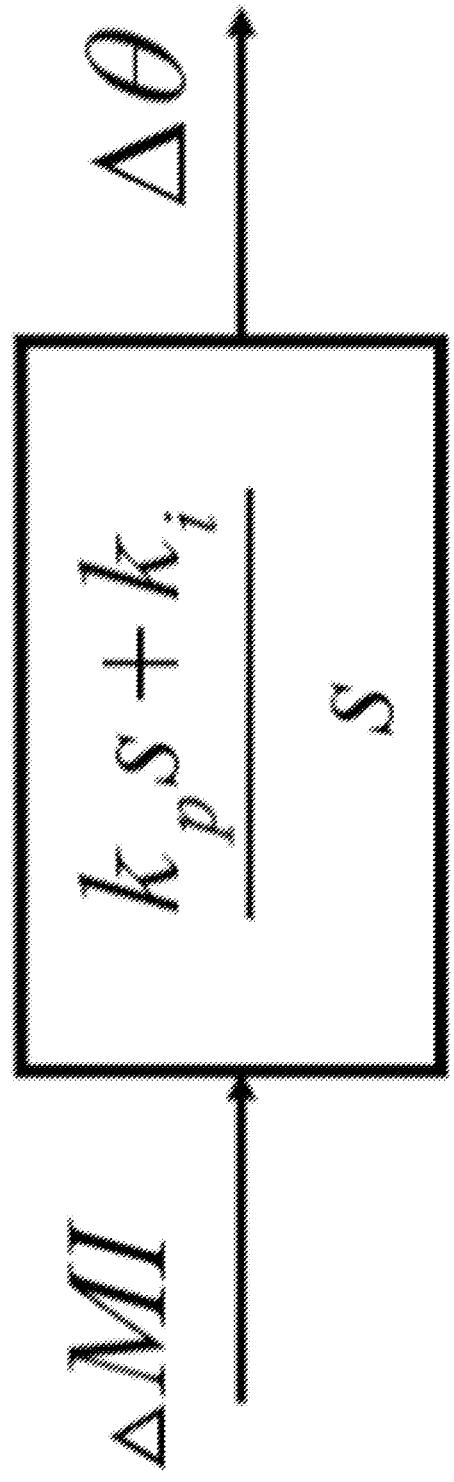
FIG. 4 is a schematic diagram of a current command angle compensator.

3. Current command angle compensator: As shown in FIG. 4, the output of THE modulation index deviation calculator $\Delta MI$ is used as the input, and after passing through proportional-integral PI compensator, the output is the correction angle $\Delta\theta$:

$$\Delta\theta = \frac{k_p s + k_i}{s} \Delta MI$$

where $k_p$ and $k_i$ are the proportional coefficient and integral coefficient of the proportional-integral compensator.

Figure 5:
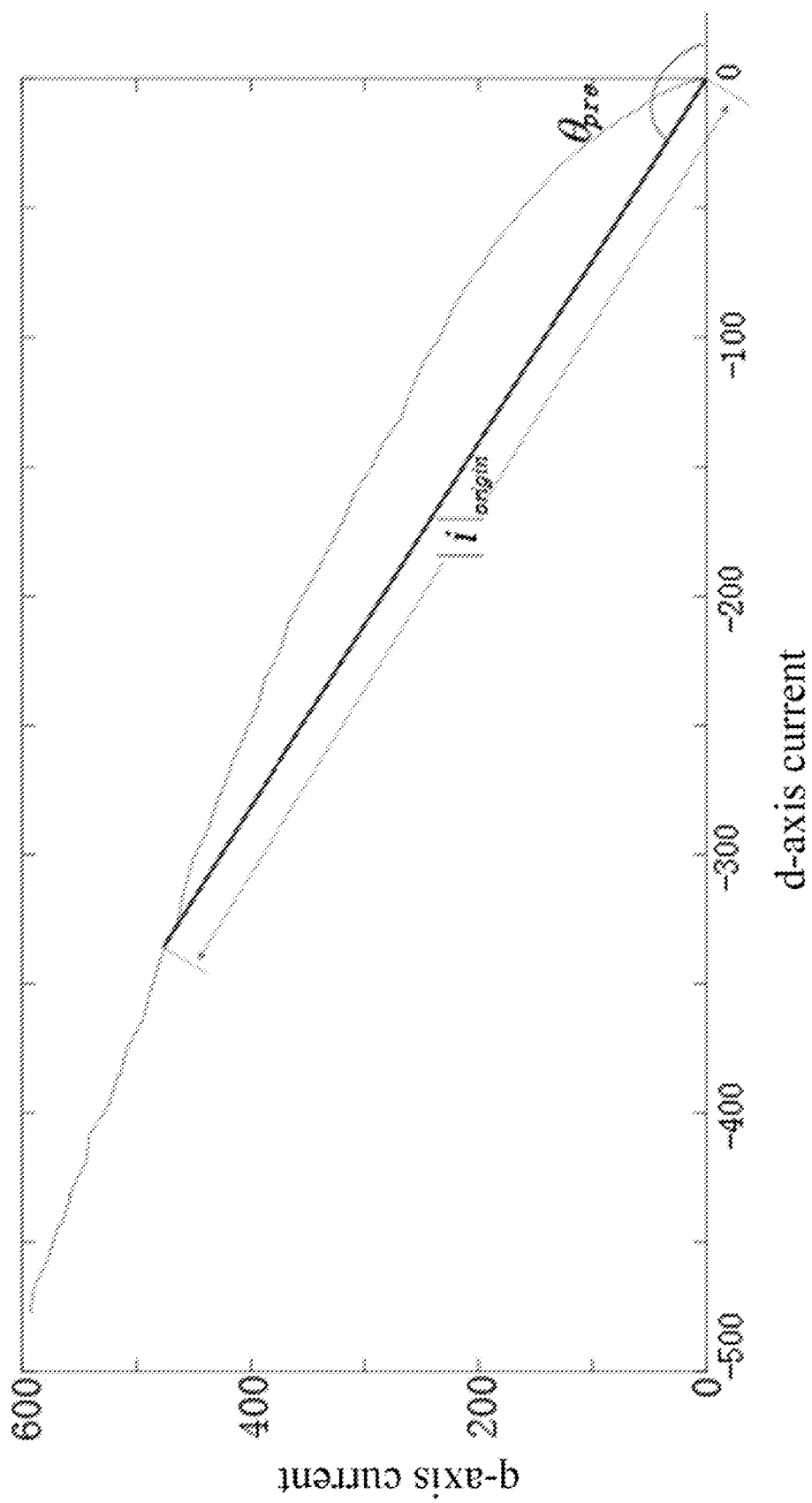
FIG. 5 is a schematic diagram of the preset angle set by the current angle preset; where the unit of current is A.

4. Current angle preset: as shown in FIG. 5, the orientation of the standard motor is limited by depicting the current angle curve of the maximum toque per ampere (MTPA), and the current angle is preset as $\theta_{pre}$ according to the dq current curve in MTPA (1000 rpm).

5. Current command angle limit comparator: the angle compensated by the current command angle compensator is limited to be above the preset angle $\theta_{pre}$ of the current angle preset, $\theta + \Delta \geq \theta_{pre}$; where $\theta$ is the angle of a current vector before flux weakening.

6. Current given amplitude compensator: after the current command angle compensator completes the angle compensation, it is considered that the system has met the stability requirements of flux weakening, and then its output is corrected.

A real-time calculation power $P_{calcu}$:

$$P_{calcu} = U_{bus} \times I_{bus}$$

where $U_{bus}$ is a sampled value of a bus voltage $V_{dc}c$, and $I_{bus}$ is a sampled value of a bus current $I_{dc}$.

A difference between a DC power $P_{tab}$ that should be operated at this time and the power $P_{calcu}$ calculated in real time is obtained:

$$\Delta P = P_{tab} - P_{calcu}$$

where, the direct current power $P_{tab}$ is obtained by looking up the table.

Figure 6:
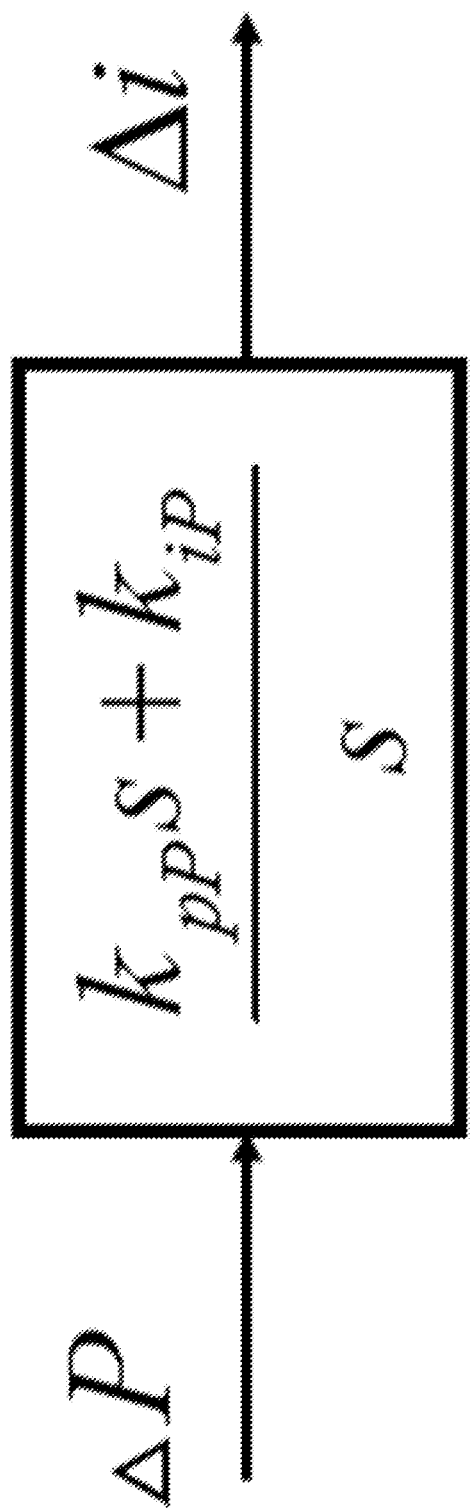
FIG. 6 is a schematic diagram of a current compensator with a given amplitude.

$\Delta P$ is used as the input of the current given amplitude compensator, as shown in FIG. 6, and then the adjustment of the current given amplitude $\Delta i$ is adjusted by the proportional integral PI:

$$\Delta i = \frac{k_{pP}s + k_{iP}}{s}\Delta P$$

where $k_{pP}$ and $k_{iP}$ are proportional coefficient and integral coefficient of proportional integration in the current given amplitude compensator.

7. Current given vector corrector (sin/cos): the current angle preset and the current given amplitude compensator are integrated to calculate the current $i_{dref}$ and $i_{qref}$ of the dq axis after flux weakening as follows:

$$\begin{cases} i_{qref} = |i| \cos(\theta + \Delta\theta) \\ i_{dref} = -|i|\sin(\theta + \Delta\theta) \end{cases} \theta + \Delta\theta > \theta_{pre}$$

$$\begin{cases} i_{qref} = |i| \cos(\theta_{pre}) \\ i_{dref} = -|i|\sin(\theta_{pre}) \end{cases} \text{else}$$

$$|i| = |i|_{origin} + \Delta i$$

where $|i|_{origin}$ is the magnitude of a current vector before flux weakening, and $|i\|$ is the magnitude of the current vector after $\Delta i$ compensation.

Figure 7:
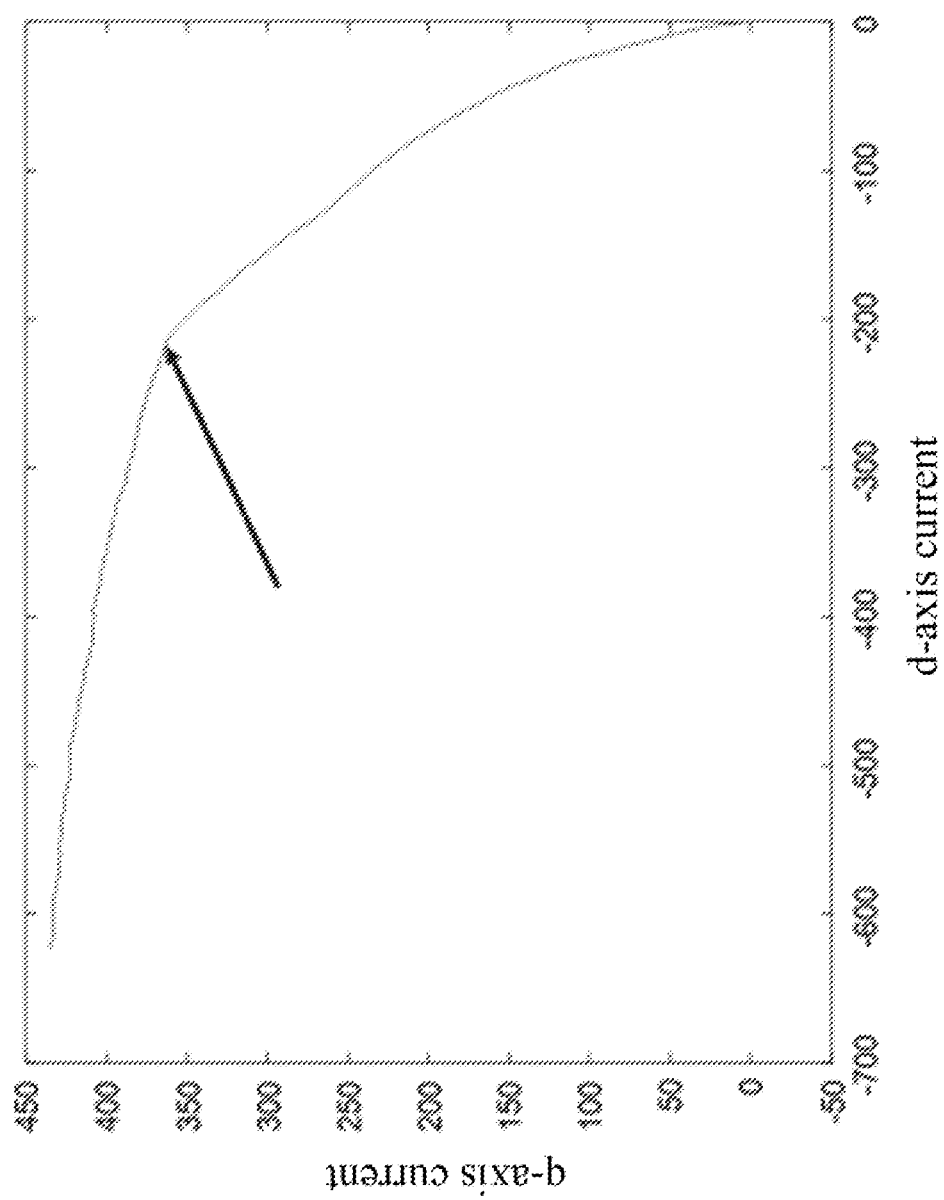
FIG. 7 is a schematic diagram of current angle correction in weak magnetic region; Where the unit of current is A.
Figure 8:
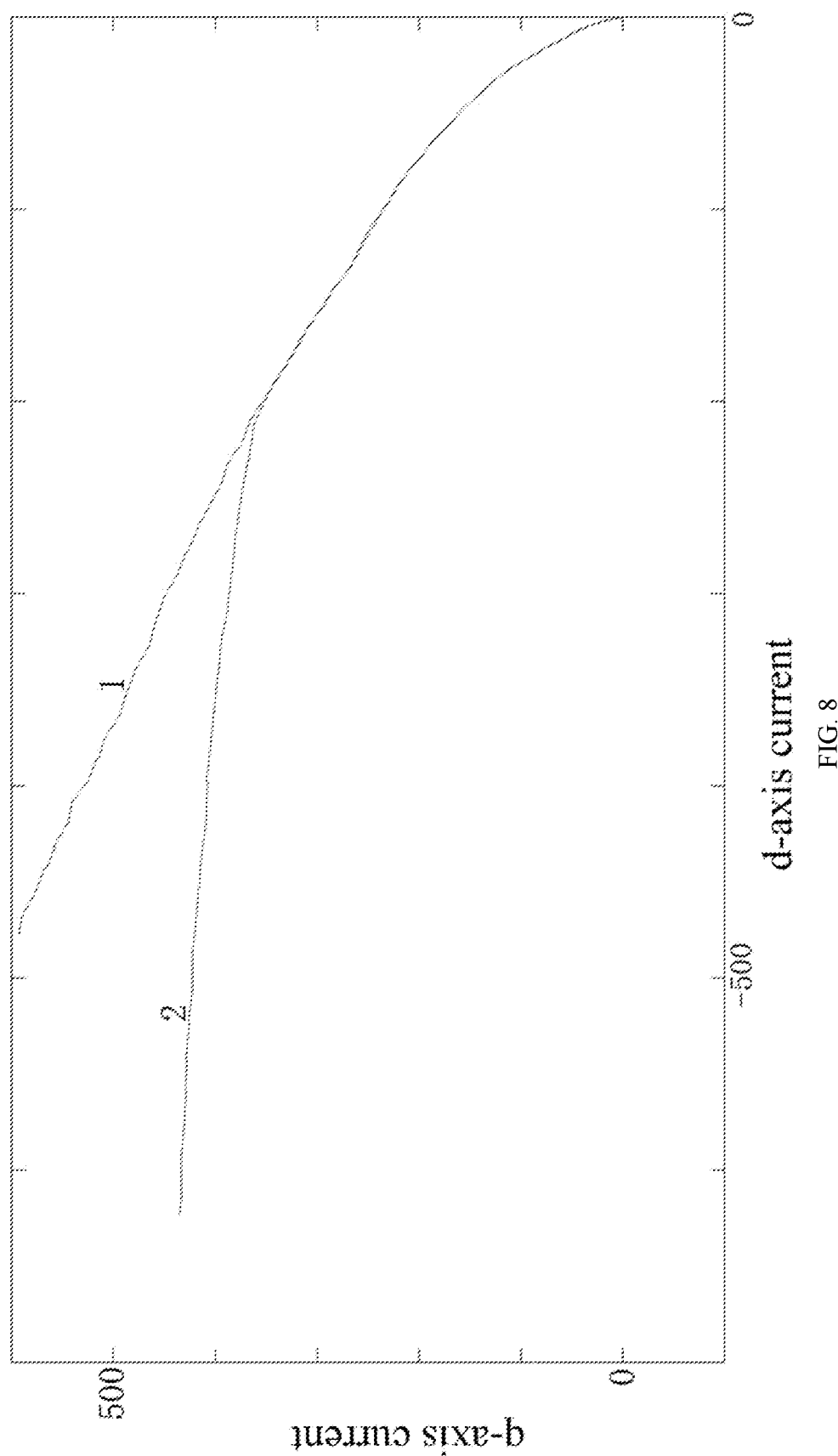
FIG. 8 is a schematic diagram of the change trend of current angle before and after correction; where, the unit of current is A, 1 is before correction and 2 is after correction.
Figure 9:
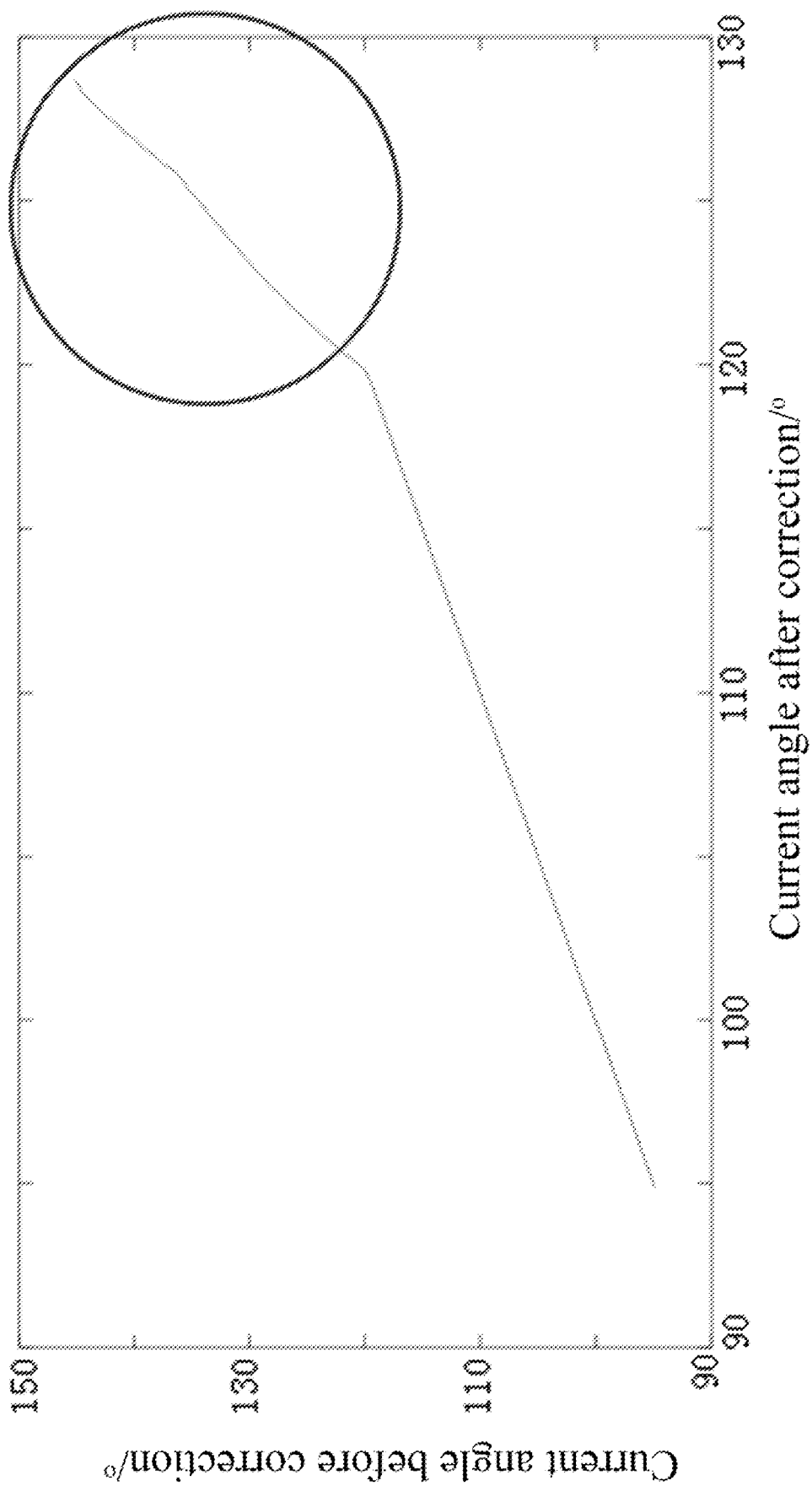
FIG. 9 is a comparison diagram of current angles before and after correction.

In this embodiment, the electric drive system M1 is constructed based on all the above modules, and the test data under the same electric drive system M1 are obtained as shown in FIGS. 7 to 9, which proves the effectiveness of the current angle preset, the current command angle limit comparator and the current given vector corrector. As shown in FIG. 7, starting from the flux weakening inflection point indicated by the arrow, the current command angle limit comparator and the current given vector corrector start to function, and the dq current running curve changes correspondingly. As shown in FIG. 8, the current angle is automatically corrected in the flux-weakening region. As shown in FIG. 9, when the slope of the curve in the figure is not 1, it means that the actual angle is larger than the preset angle $\theta_{pre}$. After 120°, the current given vector corrector corrects the angle, and the circle shows the correction effect.

Figure 10:
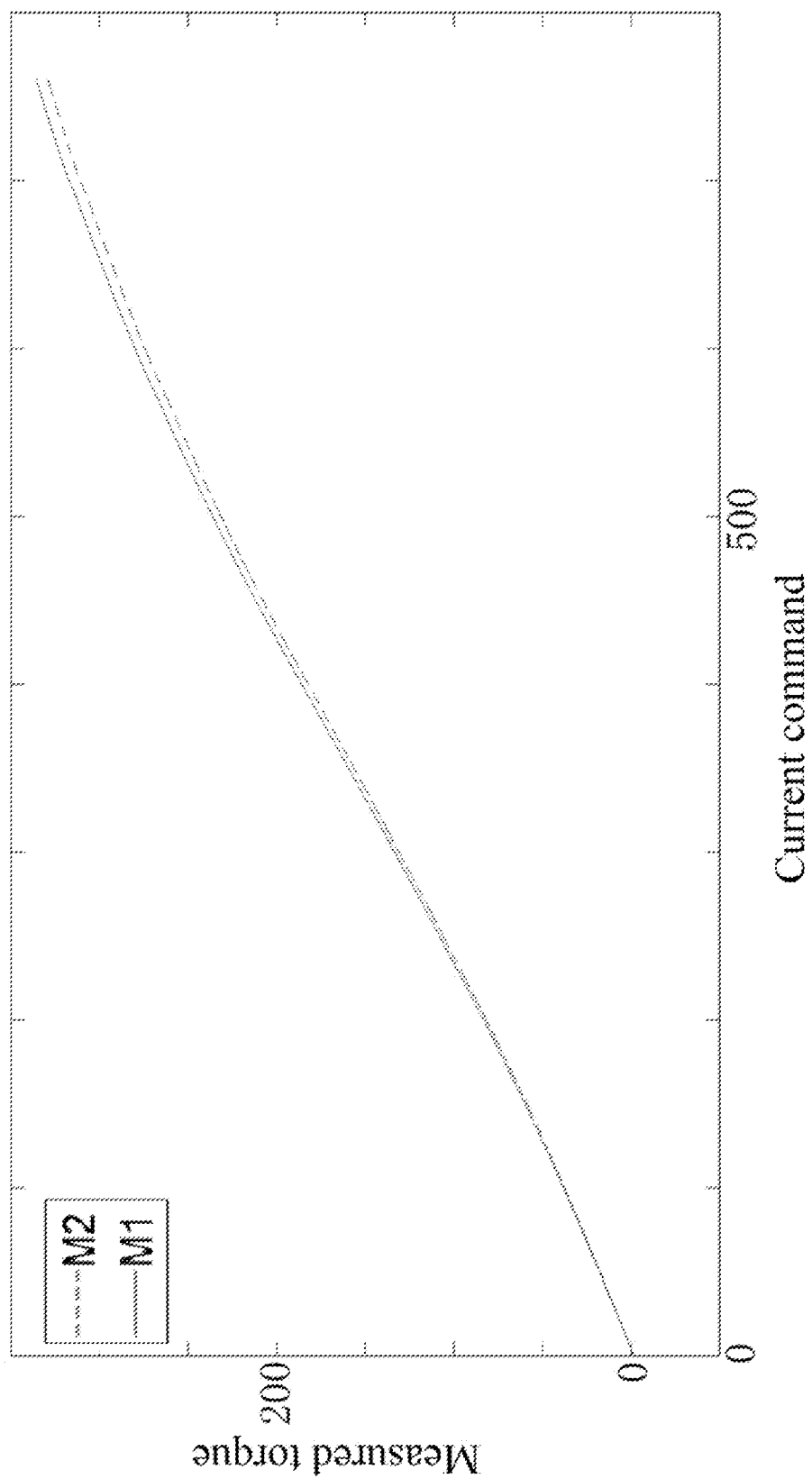
FIG. 10 is a comparison diagram of measured current-torque curves of electric drive systems M1 and M2; the unit of the torque is Nm, and the unit of the current is A.
Figure 11:
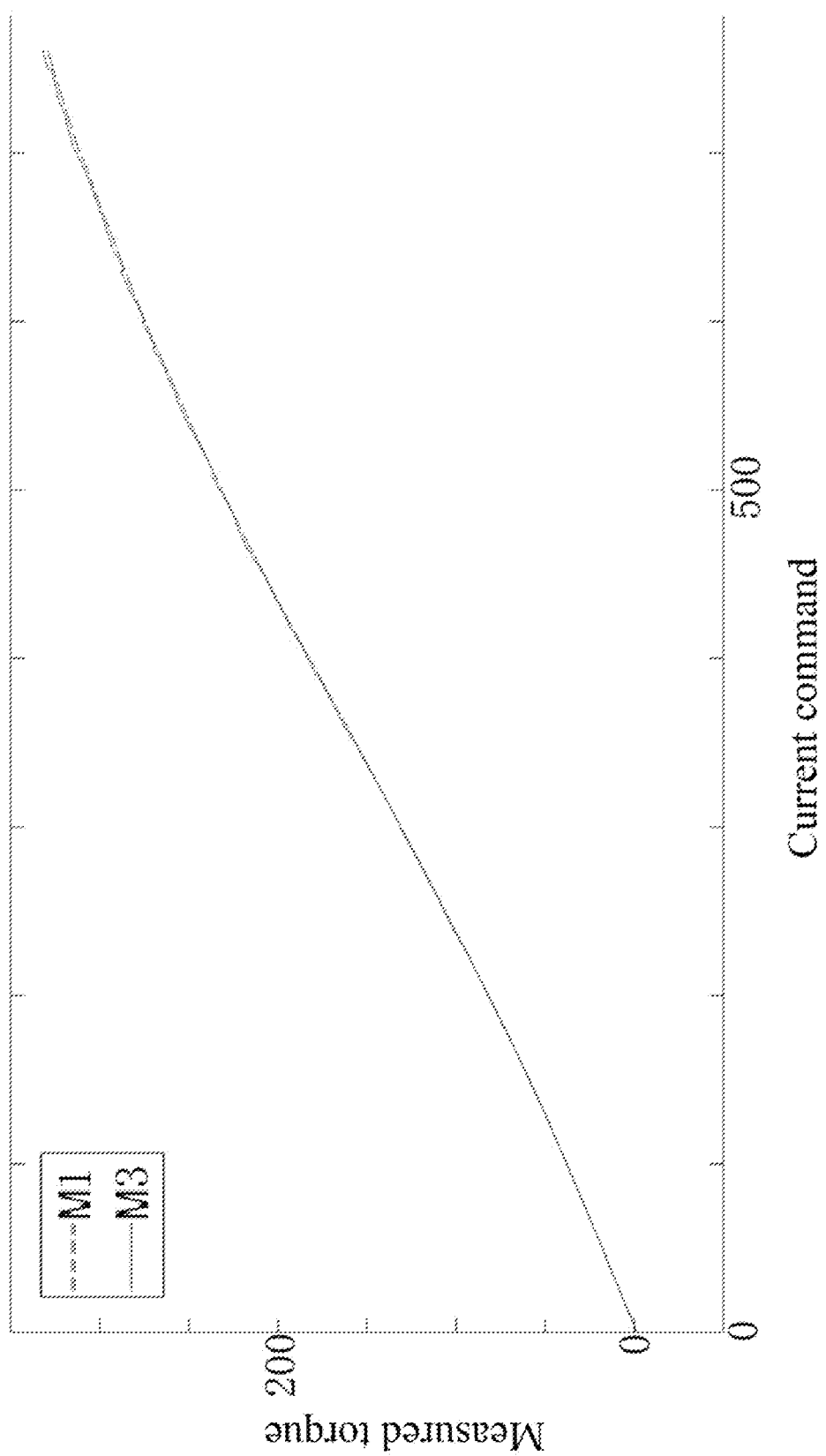
FIG. 11 is a comparison diagram of measured current-torque curves of electric drive systems M1 and M3; the unit of the torque is Nm, and the unit of the current is A.

The current given amplitude compensator in the electric drive system M1 is removed to obtain another electric drive system M2, and the current sampling gain of M2 to be higher than M1, with the floating ratio of 3%; as shown in FIG. 10, the current sampling gain of the electric drive system M2 is greater than M1, resulting in the actual torque of M2 being less than M1. A current given amplitude compensator is added to the electric drive system M2 to obtain a electric drive system M3, and the current sampling gains of M2 and M3 are the same. As shown in FIG. 11, the torque of the electric drive system M3 using the current given amplitude compensator is basically the same as that of M1. To sum up, FIGS. 10-11 prove the effectiveness of the current given amplitude compensator.

What is claimed is:

1. A vector control method for a vehicle permanent magnet synchronous motor based on a DC power, comprising a current closed-loop adjuster, a modulation index deviation calculator, a current command angle compensator, a current angle preset, a current command angle limit comparator, a current given amplitude compensator and a current given vector corrector;

wherein an input of the current closed-loop adjuster is a dq current command output by the current given vector corrector, and after passing through a proportional-integral controller, a dq voltage command is output;

an input of the modulation index deviation calculator is the dq voltage command output by the current closed-loop adjuster; after extraction of a sum of squares, an expected modulation index $MI_{ref}$ is obtained, and then a difference between the expected modulation index and an expected maximum modulation index $MI_{max}$ of the control system is obtained; after passing through a low-pass filter, a modulation index deviation $\Delta MI$ is output;

an input of the current angle compensator is the modulation index deviation output by the modulation index deviation calculator, and after passing through a proportional-integral compensator, a correction angle $\Delta\theta$ is output;

the current angle preset is used for presetting a current angle $\theta_{pre}$;

the current command angle limit comparator is used for limiting a current angle compensated by the correction angle output by the current command angle compensator to be above the current angle preset by the current angle preset;

$$\theta + \Delta\theta \geq \theta_{pre}$$

where $\theta$ is the current angle before flux weakening control;

an input of the current given amplitude compensator is a difference $\Delta P$ between an active power and a real-time power, and a current given amplitude adjustment $\Delta i$ is output after proportional-integral adjustment; wherein the real-time power $P_{calcu}$ is:

$$P_{calcu} = U_{bus} \times I_{bus}$$

where $U_{bus}$ is a sampled value of a bus voltage and $I_{bus}$ is a sampled value of a bus current;

an input of the current given vector corrector is a current $|i|$ compensated by the current given amplitude adjustment output by the current given amplitude compensator, and based on the current angle preset by the current angle preset, the dq current commands $i_{dref}$ and $i_{qref}$ after flux weakening control are calculated:

$$\begin{cases} i_{qref} = |i| \cos(\theta + \Delta\theta) \\ i_{dref} = -|i|\sin(\theta + \Delta\theta) \end{cases} \theta + \Delta\theta > \theta_{pre}$$

$$\begin{cases} i_{qref} = |i| \cos(\theta_{pre}) \\ i_{dref} = -|i|\sin(\theta_{pre}) \end{cases} \text{else}$$

$$|i| = |i|_{origin} + \Delta i$$

where $|i|_{origin}$ is a current before flux weakening control.

2. The vector control method for a vehicle permanent magnet synchronous motor based on a DC power according to claim 1, wherein in the current closed-loop adjuster, the dq voltage command is obtained from the dq current commands $i_{dref}$ and $i_{qref}$ and the deviation fed back by the dq current through the proportional-integral controller, respectively.

3. The vector control method for a vehicle permanent magnet synchronous motor based on a DC power according to claim 2, wherein in the modulation index deviation calculator, a difference $\Delta MI_0$ between $MI_{max}$ and $MI_{ref}$ is:

$$\Delta MI_0 = MI_{ref} - MI_{max}$$

-continued $$MI_{ref} = \frac{\sqrt{3(v_{d\_ref}^2 + v_{q\_ref}^2)}}{V_{dc}}$$

where $v_{d\_ref}$ and $v_{q\_ref}$ are dq voltage commands, and $V_{dc}$ is the bus voltage.

4. The vector control method for a vehicle permanent magnet synchronous motor based on a DC power according to claim 3, wherein in the current command angle compensator, the correction angle $\Delta\theta$ is:

$$\Delta\theta = \frac{k_p s + k_i}{s} \Delta MI$$

where $k_p$ is a proportional coefficient of the proportional-integral compensator and $k_i$ is an integral coefficient of the proportional-integral compensator; $\Delta MI$ is a modulation index deviation.

5. The vector control method for a vehicle permanent magnet synchronous motor based on a DC power according to claim 4, wherein the current angle preset limits an orientation of the motor by depicting a current angle curve of a maximum toque per ampere MTPA, and presets the current angle as $\theta_{pre}$.

6. The vector control method for a vehicle permanent magnet synchronous motor based on a DC power according to claim 5, wherein in the current given amplitude compensator, the current given amplitude adjustment $\Delta I$ is:

$$\Delta i = \frac{k_{pP} s + k_{iP}}{s} \Delta P$$

$$\Delta P = P_{tab} - P_{calcu}$$

where $P_{tab}$ is an active power; $k_{pP}$ and $k_{iP}$ are proportional coefficient and integral coefficient of proportional integration in the current given amplitude compensator.

* * * * *